United States Patent
Yamaguchi et al.

(10) Patent No.: US 12,360,616 B2
(45) Date of Patent: Jul. 15, 2025

(54) DISPLAY APPARATUS AND IMAGE FORMING APPARATUS

(71) Applicant: SEIKO EPSON CORPORATION, Tokyo (JP)

(72) Inventors: Yoshiyuki Yamaguchi, Nagano (JP); Toru Matsuyama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/604,561

(22) Filed: Mar. 14, 2024

(65) Prior Publication Data

US 2024/0310934 A1 Sep. 19, 2024

(30) Foreign Application Priority Data

Mar. 16, 2023 (JP) ................. 2023-041794

(51) Int. Cl.
| | |
|---|---|
| *G09G 5/00* | (2006.01) |
| *G06F 3/0354* | (2013.01) |
| *G06F 3/041* | (2006.01) |
| *H04N 1/00* | (2006.01) |

(52) U.S. Cl.
CPC .......... *G06F 3/03547* (2013.01); *G06F 3/041* (2013.01); *H04N 1/00411* (2013.01)

(58) Field of Classification Search
CPC ...... G06F 3/03547; G06F 3/041; G06F 3/016; G06F 21/84; H04N 1/00411; H04N 1/00188
USPC ................. 345/173, 619; 358/1.15
See application file for complete search history.

(56) References Cited

U.S. PATENT DOCUMENTS

| | | | |
|---|---|---|---|
| 6,118,435 A * | 9/2000 | Fujita ...................... | G06F 3/016 345/173 |
| 2008/0112005 A1* | 5/2008 | Murray .............. | H04N 1/00188 358/1.15 |
| 2013/0009987 A1* | 1/2013 | Takishita ................ | G06F 21/84 345/619 |

FOREIGN PATENT DOCUMENTS

JP 2011-171924 A 9/2011

* cited by examiner

*Primary Examiner* — Abdul-Samad A Adediran
(74) *Attorney, Agent, or Firm* — Global IP Counselors, LLP

(57) ABSTRACT

A display apparatus includes: a touch panel that includes a transparent electrode and a first locking portion; and a display panel that displays information, in which the touch panel is detachably fixed to the display apparatus by fixing the first locking portion to a second locking portion provided in the display apparatus without using an adhesive.

13 Claims, 11 Drawing Sheets

DISPLAY APPARATUS AND IMAGE FORMING APPARATUS

The present application is based on, and claims priority from JP Application Serial Number 2023-041794, filed Mar. 16, 2023, the disclosure of which is hereby incorporated by reference herein in its entirety.

BACKGROUND

1. Technical Field

The present disclosure relates to a display apparatus and an image forming apparatus.

2. Related Art

A display apparatus that includes a touch panel for inputting information and a display panel for displaying information is widely known. Generally, the touch panel is fixed to the display apparatus by using an adhesive (see, for example, JP-A-2011-171924).

However, when the touch panel is fixed to the display apparatus by using the adhesive as in the related art, it may be difficult to remove the touch panel from the display apparatus without damaging the touch panel, for example, when discarding the display apparatus.

Furthermore, when the touch panel is fixed to the display apparatus by using the adhesive as in the related art, for example, work to remove the touch panel may become complicated when discarding the display apparatus. For this reason, the related art has room for improvement in some or all of four goals, Goal 12 "Ensure sustainable consumption and production patterns", Goal 3 "Ensure healthy lives and promote well-being for all at all ages", Goal 11 "Make cities and human settlements inclusive, safe, resilient, and sustainable", and Goal 10 "Reduce income inequality within and among countries", among 17 sustainable development goals (SDGs) adopted by the United Nations General Assembly on Sep. 25, 2015.

SUMMARY

According to an aspect of the present disclosure, a display apparatus includes: a touch panel that includes a transparent electrode and a first locking portion; and a display panel that displays information, in which the touch panel is detachably fixed to the display apparatus by fixing the first locking portion to a second locking portion provided in the display apparatus without using an adhesive.

According to an aspect of the present disclosure, an image forming apparatus includes: a display apparatus that includes a touch panel that includes a transparent electrode and a first locking portion, and a display panel that displays information; a transport unit that transports a medium; and an image forming unit that forms an image by applying a coloring material onto the medium, in which the touch panel is detachably fixed to the display apparatus by fixing the first locking portion to a second locking portion provided in the display apparatus without using an adhesive.

DESCRIPTION OF EMBODIMENTS

Figure 1:
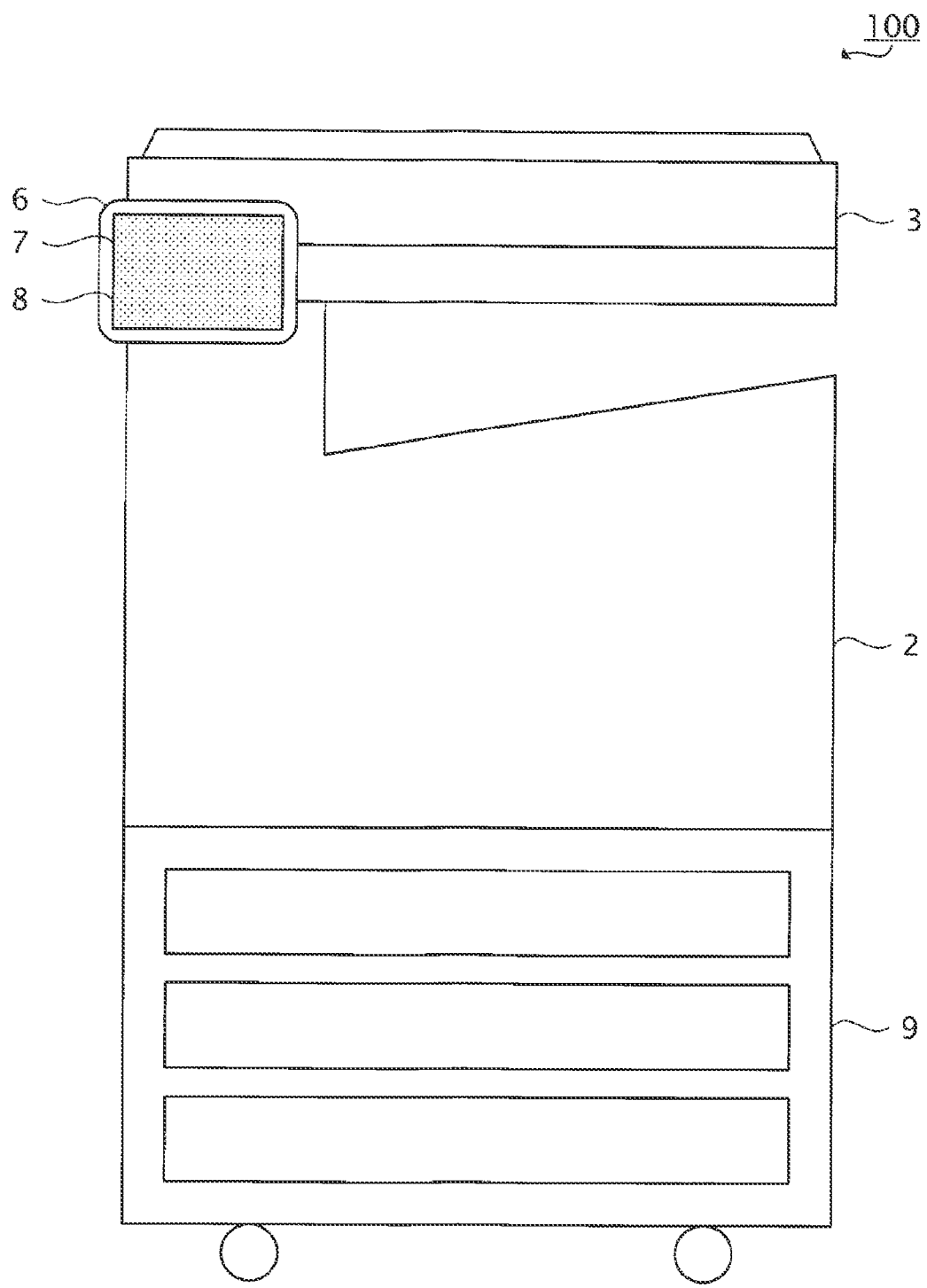
FIG. 1 is a view illustrating an example of an appearance of a printing apparatus according to an embodiment of the present disclosure.

Hereinafter, embodiments for carrying out the present disclosure will be described with reference to the drawings. However, the dimensions and scale of each portion are appropriately different from the actual ones in the drawings. Furthermore, since the embodiments described below are suitable specific examples of the present disclosure, various technically favorable limitations are attached thereto. However, the scope of the present disclosure is not limited to the embodiments unless expressly stated otherwise in the following description, particularly limiting the present disclosure.

A. Embodiment

In the present embodiment, an image forming apparatus will be described using a printing apparatus 100 as an example.

1. Configuration of Printing Apparatus

An overview of a configuration of the printing apparatus 100 according to the present embodiment will be described below with reference to FIGS. 1 and 2.

FIG. 1 is a view illustrating an example of an appearance of the printing apparatus 100. FIG. 2 is a functional block diagram illustrating an example of a functional configuration of the printing apparatus 100.

Figure 2:
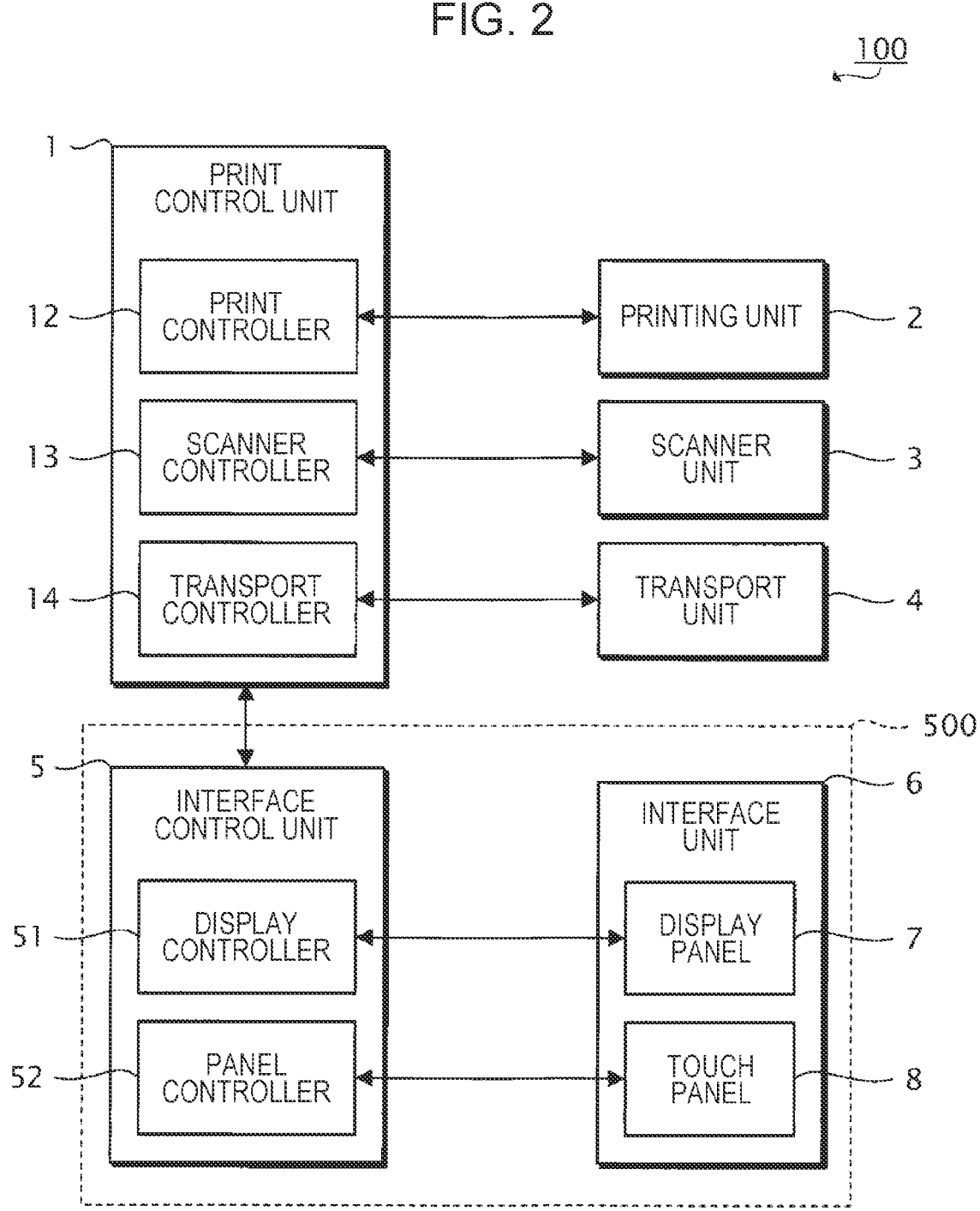
FIG. 2 is a block diagram illustrating an example of a configuration of the printing apparatus.

As illustrated in FIGS. 1 and 2, the printing apparatus 100 includes a printing unit 2 that executes printing processing of ejecting ink onto printing paper PP to form an image, a scanner unit 3 for executing scanning processing of reading an image formed on the printing paper PP or other media; a transport unit 4 for transporting the printing paper PP inside the printing apparatus 100; a print control unit 1 that controls the printing unit 2, the scanner unit 3, and the transport unit 4, and a feeding unit 9 that accommodates the printing paper PP. In the present embodiment, the printing unit 2 is an example of an "image forming unit". The printing apparatus 100 further includes a display apparatus 500. The display apparatus 500 includes an interface unit 6 including a display panel 7 that displays various types of information to a user of the printing apparatus 100 and a touch panel 8 that receives a command input from the user of the printing apparatus 100, and an interface control unit 5 that controls the interface unit 6.

The transport unit 4 supplies the printing paper PP accommodated in the feeding unit 9 to the printing unit 2. Then, once the printing unit 2 forms an image on the printing paper PP, the transport unit 4 discharges the printing paper PP.

The print control unit 1 includes a processing circuit such as a CPU or an FPGA, and controls the printing unit 2, the scanner unit 3, and the transport unit 4. Here, the CPU is an abbreviation for central processing unit, and the FPGA is an abbreviation for field programmable gate array.

As illustrated in FIG. 2, the processing circuit provided in the print control unit 1 executes a control program for the printing apparatus 100 stored in a storage device (not illustrated), and is operated according to the control program, thereby functioning as a print controller 12 that controls the printing unit 2, a scanner controller 13 that controls the scanner unit 3, and a transport controller 14 that controls the transport unit 4.

The interface control unit 5 includes a processing circuit such as a CPU or an FPGA, and controls the display panel 7 and the touch panel 8.

As illustrated in FIG. 2, the processing circuit provided in the interface control unit 5 executes a control program for the display apparatus 500 stored in a storage device (not illustrated), and is operated according to the control program, thereby functioning as a display controller 51 that controls the display panel 7 and a panel controller 52 that controls the touch panel 8.

2. Configuration of Display Panel 7

Hereinafter, an overview of a configuration of the display panel 7 according to the present embodiment will be described with reference to FIG. 3.

Figure 3:
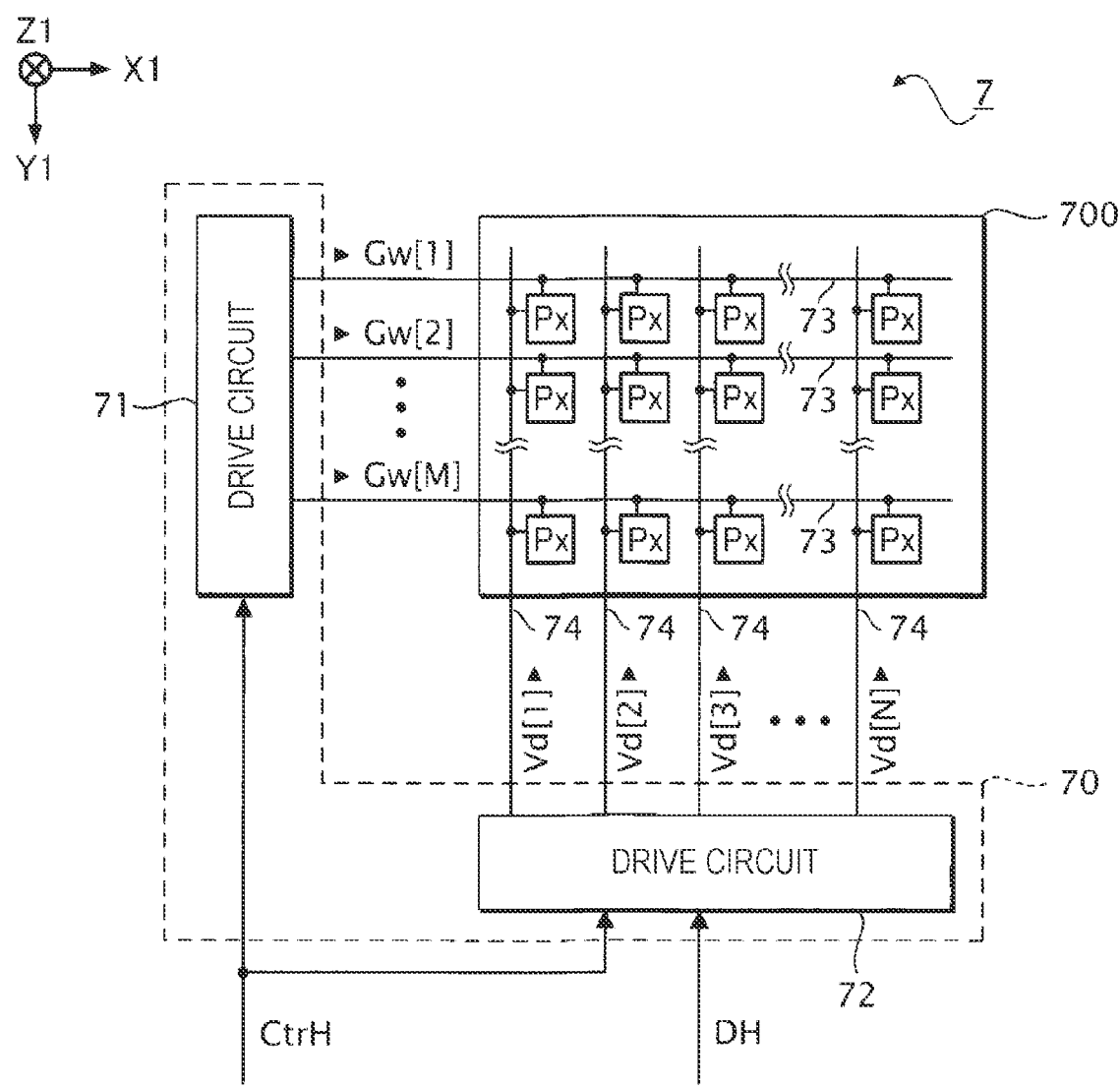
FIG. 3 is a block diagram illustrating an example of a configuration of a display panel.

FIG. 3 is a block diagram illustrating an example of the configuration of the display panel 7.

As illustrated in FIG. 3, the display panel 7 includes a display section 700 in which a plurality of pixels Px are provided, and a drive circuit 70 that drives the display section 700.

The display section 700 includes M rows of scanning lines 73 extending in an X1 direction, N columns of data lines 74 extending in a Y1 direction intersecting the X1 direction, and (M×N) pixels Px corresponding to the M rows of scanning lines 73 and the N columns of data lines 74 and provided in a matrix of M rows in the Y1 direction and N columns in the X1 direction. Here, the value M is a natural number satisfying M≥2, and the value N is a natural number satisfying N≥2.

Hereinafter, the X1 direction and an X2 direction opposite to the X1 direction are collectively referred to as an X-axis direction, the Y1 direction and a Y2 direction opposite to the Y1 direction are collectively referred to as a Y-axis direction, and a Z1 direction intersecting the X-axis direction and the Y-axis direction and a Z2 direction opposite to the Z1 direction are collectively referred to as a Z-axis direction. In the present embodiment, the Z1 direction is, for example, a direction from the user of the printing apparatus 100 toward the display section 700. In the present embodiment, as an example, it is assumed that the X-axis direction, the Y-axis direction, and the Z-axis direction are directions orthogonal to one another. However, the present disclosure is not limited to such an aspect. It is sufficient that the X-axis direction, the Y-axis direction, and the Z-axis direction be directions intersecting one another.

The drive circuit 70 includes a drive circuit 71 and a drive circuit 72. A control signal CtrH for controlling the drive circuit 70 is supplied from the display controller 51 to the drive circuit 71. The control signal CtrH for controlling the drive circuit 70 and display information DH indicating an image to be displayed on the display section 700 is supplied from the display controller 51 to the drive circuit 72.

The drive circuit 71 generates a selection signal Gw[m] for selecting the m-th row of scanning line 73 based on the control signal CtrH. Then, the drive circuit 71 sets a signal level of the selection signal Gw[m] to a predetermined signal level for selecting the m-th row of scanning line 73 in the m-th selection period among M selection periods included in a unit display period defined by the control signal CtrH. Thereby, the drive circuit 71 can sequentially select first to M-th rows of scanning lines 73 in the unit display period. Here, the variable m is a natural number satisfying 1≤m≤M.

The drive circuit 72 generates a gradation designation signal Vd[n] that designates a gradation to be displayed in the pixel Px based on the display information DH, and outputs the generated gradation designation signal Vd[n] to the n-th column of data line 74 at a timing determined based on the control signal CtrH. Specifically, the drive circuit 72 outputs the gradation designation signal Vd[n] to the n-th column of data line 74 in each of the M selection periods during which the drive circuit 71 selects the first to M-th rows of scanning lines 73. Here, the variable n is a natural number satisfying 1≤n≤N. Further, the display information DH may be a signal including gradation designation signals Vd[1] to Vd[N].

In this way, in the m-th selection period, the drive circuit 70 can output the selection signal Gw[m] that selects the m-th row of scanning line 73, and output the gradation designation signal Vd[n] to the n-th column of data line 74 to cause the pixel Px of the m-th row and the n-th column to display the gradation designated by the gradation designation signal Vd[n]. Thereby, the display panel 7 can display an image indicated by the display information DH on the display section 700 in the unit display period including M selection periods.

3. Overview of Touch Panel

Hereinafter, an overview of the touch panel 8 according to the present embodiment will be described with reference to FIGS. 4 to 8.

Figure 4:
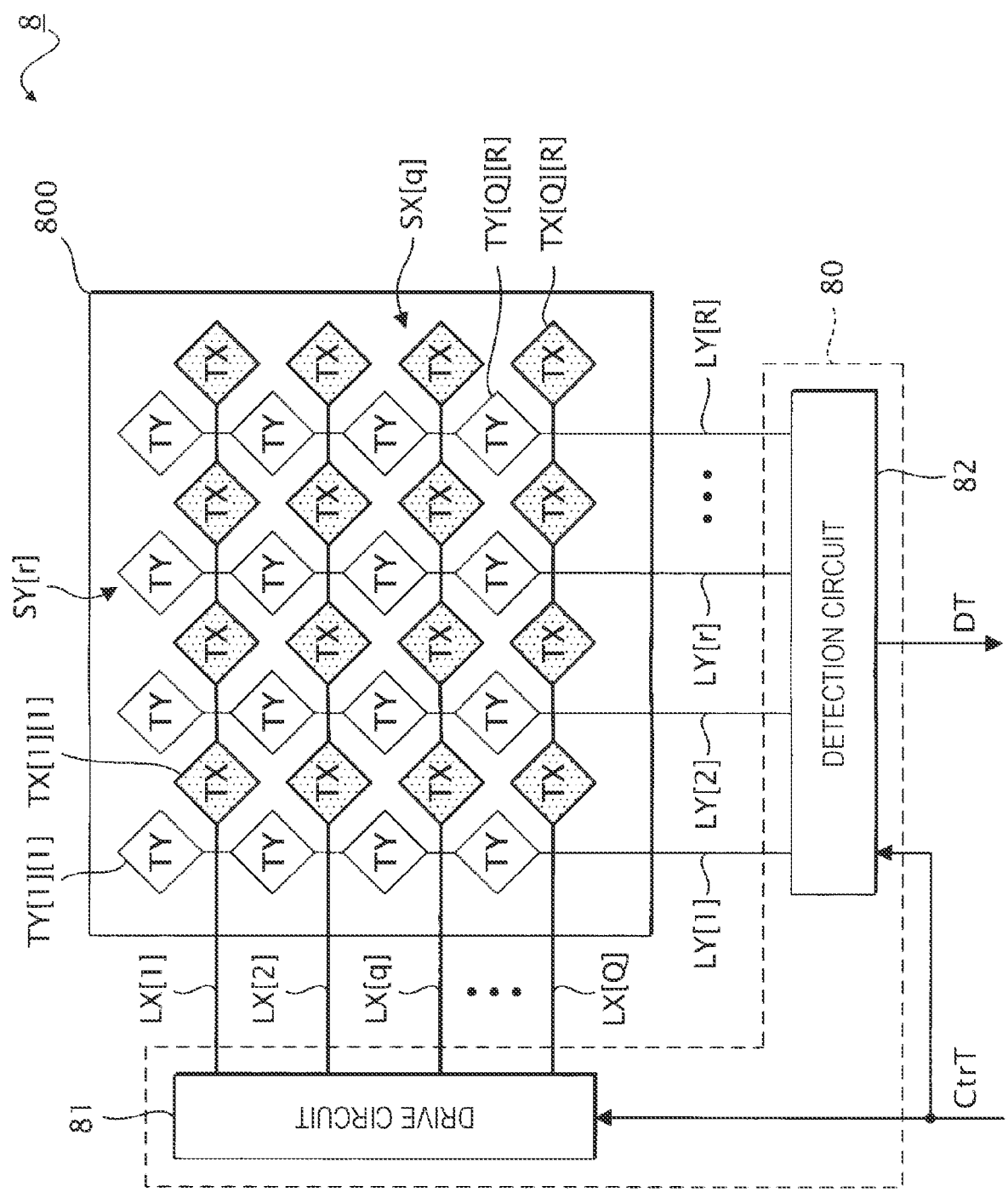
FIG. 4 is a block diagram illustrating an example of a configuration of a touch panel.
Figure 5:
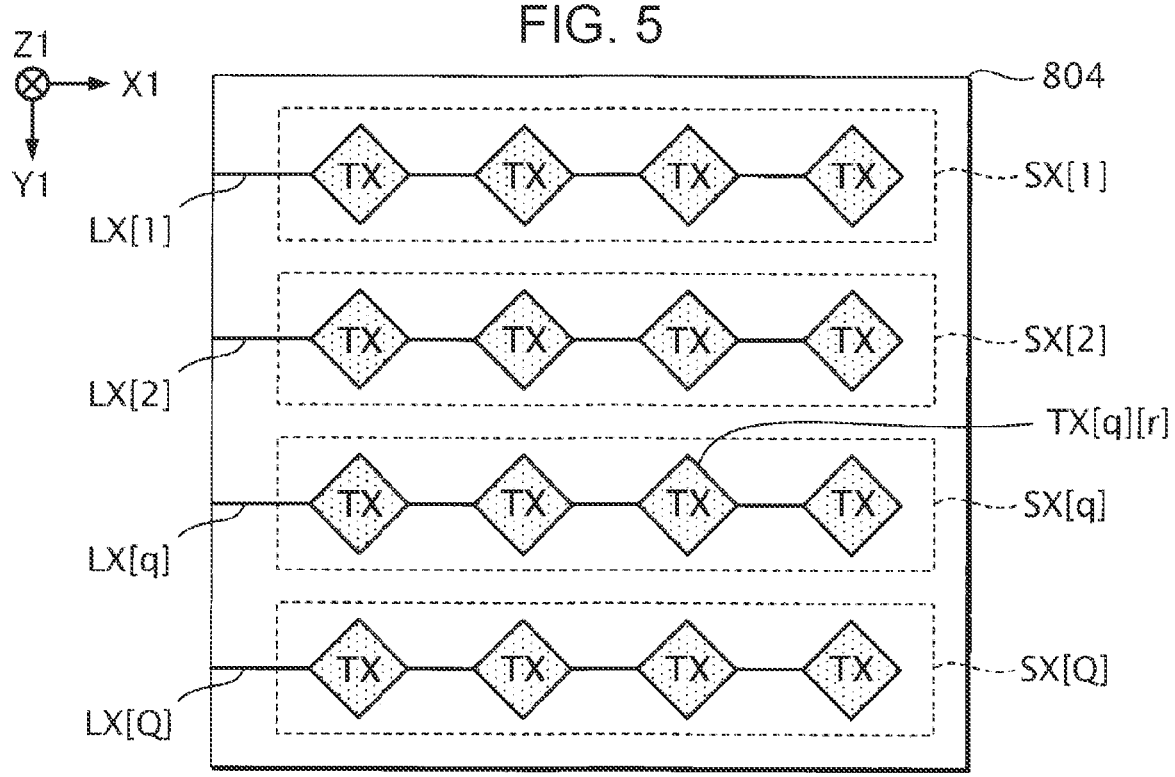
FIG. 5 is a block diagram illustrating an example of a configuration of a drive electrode layer.
Figure 6:
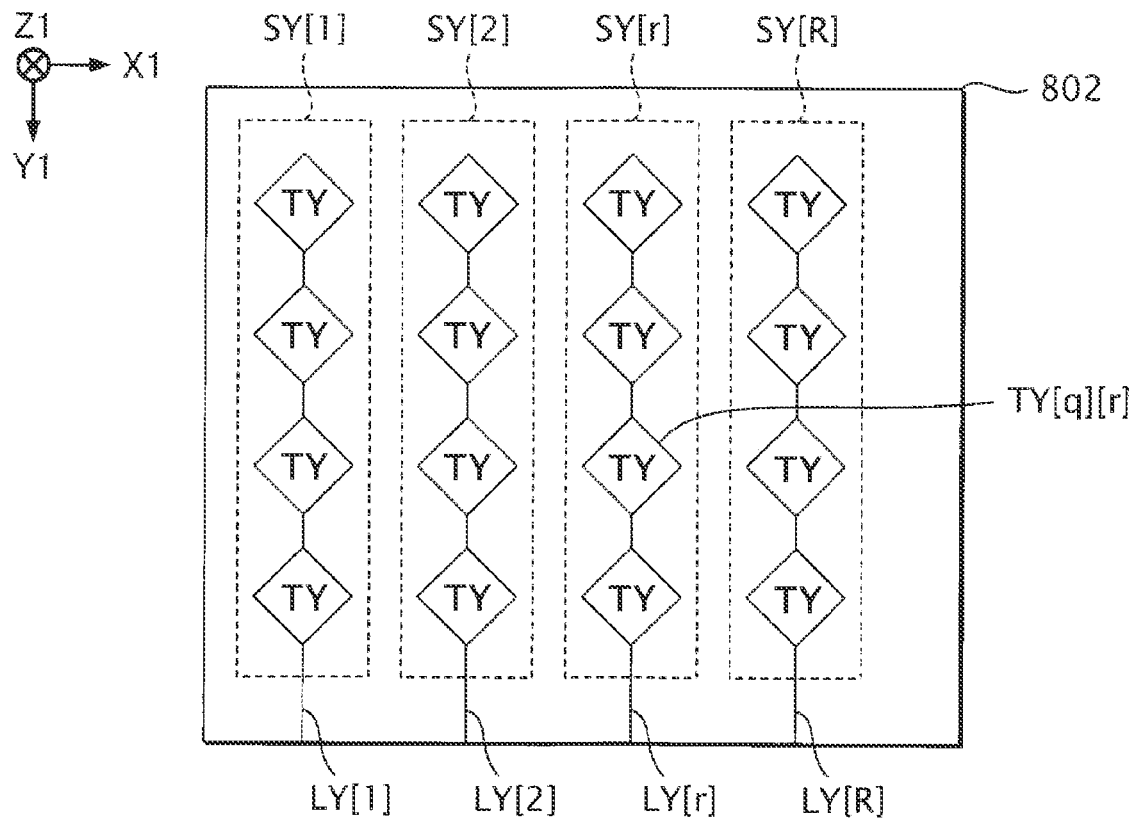
FIG. 6 is a block diagram illustrating an example of a configuration of a detection electrode layer.

FIG. 4 is a block diagram illustrating an example of a configuration of the touch panel 8. FIG. 5 is a block diagram illustrating an example of a configuration of a drive electrode layer 804 provided in the touch panel 8. FIG. 6 is a block diagram illustrating an example of a configuration of a detection electrode layer 802 provided in the touch panel 8.

As illustrated in FIG. 4, the touch panel 8 includes a detection section 800 for detecting a touch by the user of the printing apparatus 100, and a detection control circuit 80 for specifying a touch position of the user on the detection section 800.

The detection control circuit 80 includes a drive circuit 81 and a detection circuit 82. A control signal CtrT for controlling the detection control circuit 80 is supplied from the panel controller 52 to the detection control circuit 80. Further, the detection control circuit 80 outputs a touch detection signal DT indicating a result of detecting a touch made by the user for the detection section 800.

As illustrated in FIGS. 4 to 6, the detection section 800 includes the drive electrode layer 804 in which Q rows of drive electrodes SX[1] to SX[Q] arranged in the Y1 direction are provided, and the detection electrode layer 802 in which R columns of detection electrodes SY[1] to SY[R] arranged in the X1 direction are provided. Here, the value Q is a natural number satisfying Q≥2. The value R is a natural number satisfying R≥2. The R columns of detection electrodes SY[1] to SY[R] are provided in such a way as to intersect the Q rows of drive electrodes SX[1] to SX[Q] when the detection section 800 is viewed in the Z1 direction.

Hereinafter, among the Q rows of drive electrodes SX[1] to SX[Q], the q-th drive electrode SX is referred to as a drive electrode SX[q]. Here, the variable q is a natural number satisfying 1≤q≤Q. Hereinafter, among the R columns of detection electrodes SY[1] to SY[R], the r-th column of detection electrode SY is referred to as a detection electrode SY[r]. Here, the variable r is a natural number satisfying 1≤r≤R.

In the present embodiment, the drive electrodes SX[1] to Sx[Q] and the detection electrodes SY[1] to SY[R] are transparent electrodes, that is, formed of a light-transmitting conductive material. Specifically, in the present embodiment, the drive electrodes SX[1] to SX[Q] and the detection electrodes SY[1] to SY[R] are formed of ITO. Here, ITO is an abbreviation for indium tin oxide. In the present embodiment, a portion of the detection electrode layer 802 where the drive electrode SX is not provided and a portion of the drive electrode layer 804 where the detection electrode SY is not provided are formed of a light-transmitting insulating material.

As illustrated in FIG. 5, the drive electrode SX[q] includes R electrodes TX arranged in the X1 direction and a wiring LX that electrically couples the R electrodes TX. Hereinafter, the r-th electrode TX among the R electrodes TX provided on the drive electrode SX[q] is referred to as an electrode TX[q][r]. Hereinafter, the wiring LX provided on the drive electrode SX[q] is referred to as a wiring LX[q]. As described above, in the present embodiment, as an example, it is assumed that the drive electrode SX[q] includes R electrodes TX[q][1] to TX[q][R], but the present disclosure is not limited to such an aspect. The drive electrode SX[q] may include one or more electrodes TX, the number of which is different from R.

As illustrated in FIG. 6, the detection electrode SY[r] includes Q electrodes TY arranged in the Y1 direction and a wiring LY that electrically couples the Q electrodes TY. Hereinafter, among the Q electrodes TY provided on the detection electrode SY[r], the q-th electrode TY is referred to as an electrode TY[q][r]. Hereinafter, the wiring LY provided on the detection electrode SY[r] will be referred to as a wiring LY[r]. As described above, in the present embodiment, as an example, it is assumed that the detection electrode SY[r] includes Q electrodes TY[1][r] to TY[Q][r]. However, the present disclosure is not limited to such an aspect. The detection electrode SY[r] may include one or more electrodes TX, the number of which is different from Q.

Figure 7:
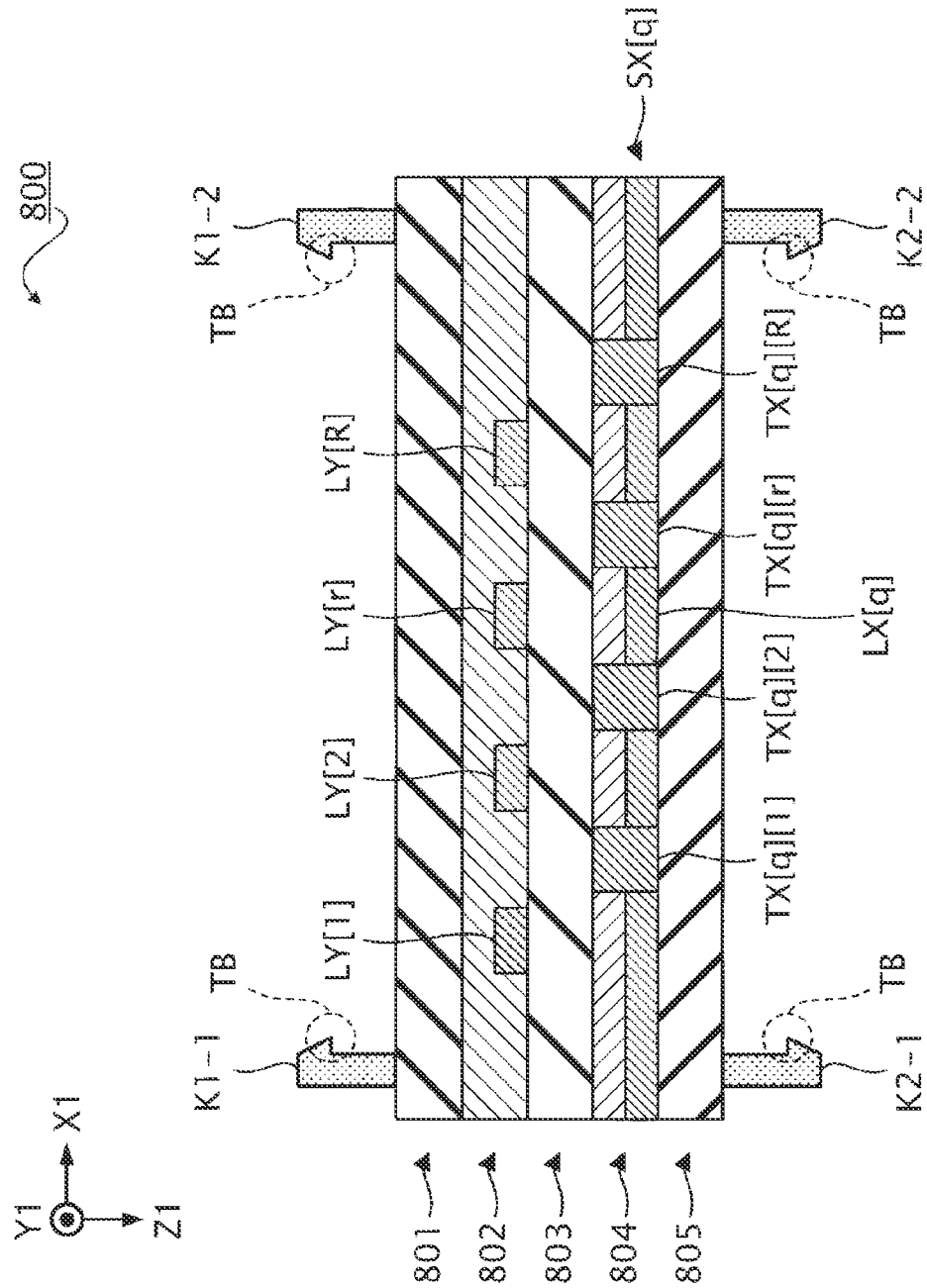
FIG. 7 is a cross-sectional view illustrating an example of a configuration of a detection section.

FIG. 7 is a cross-sectional view illustrating an example of the configuration of the touch panel 8. FIG. 7 is a cross-sectional view illustrating a cross section of the detection section 800 when the detection section 800 is cut along a plane whose normal direction is the Y1 direction and which passes through the drive electrode SX[q] in FIG. 4.

As illustrated in FIG. 7, the detection section 800 includes a protective layer 801, the detection electrode layer 802, an insulating layer 803, the drive electrode layer 804, a protective layer 805, and a plurality of locking portions K.

The protective layer 801 is formed of a light-transmitting insulating material. The user of the printing apparatus 100 inputs a command to the touch panel 8 by touching a surface of the protective layer 801 in the Z2 direction.

One or more locking portions K are provided on the surface of the protective layer 801 in the Z2 direction. Hereinafter, among the plurality of locking portions K provided in the detection section 800, the locking portion K provided on the protective layer 801 is referred to as a locking portion K1. In the present embodiment, as an example, it is assumed that two locking portions K1, a locking portion K1-1 and a locking portion K1-2, are provided on the surface of the protective layer 801 in the Z2 direction. The locking portion K1-2 is provided in the X1 direction when viewed from the locking portion K1-1. The locking portion K1-1 has a protruding portion TB that protrudes in the X1 direction. The locking portion K1-2 has a protruding portion TB that protrudes in the X2 direction.

The protective layer 805 is provided in the Z1 direction when viewed from the protective layer 801, and is formed of a light-transmitting insulating material.

One or more locking portions K are provided on the surface of the protective layer 805 in the Z1 direction. Hereinafter, among the plurality of locking portions K provided in the detection section 800, the locking portion K provided on the protective layer 805 is referred to as a locking portion K2. In the present embodiment, two locking portions K2, a locking portion K2-1 and a locking portion K2-2, are provided on the protective layer 805. The locking portion K2-2 is provided in the X1 direction when viewed from the locking portion K2-1. The locking portion K2-1 has a protruding portion TB that protrudes in the X1 direction. The locking portion K2-2 has a protruding portion TB that protrudes in the X2 direction.

The insulating layer 803 is provided between the protective layer 801 and the protective layer 805, and is formed of a light-transmitting insulating material.

The detection electrode layer 802 is provided between the protective layer 801 and the insulating layer 803. As described above, the detection electrode SY[r] including the plurality of electrodes TY[1][r] to TY[Q][r] and the wiring LY[r] that electrically couples the electrodes TY[1][r] to TY[Q][r] is formed in the detection electrode layer 802.

The drive electrode layer 804 is provided between the insulating layer 803 and the protective layer 805. As described above, the drive electrode SX[q] including the plurality of electrodes TX[q][1] to TX[q][R] and the wiring LX[q] that electrically couples the electrodes TX[q][1] to TX[q][R] is formed in the drive electrode layer 804.

Although the present embodiment exemplifies a case where the drive electrode layer 804 is positioned in the Z1 direction when viewed from the detection electrode layer 802, the present disclosure is not limited to an aspect. The drive electrode layer 804 may be provided in the Z2 direction when viewed from the detection electrode layer 802.

Figure 8:
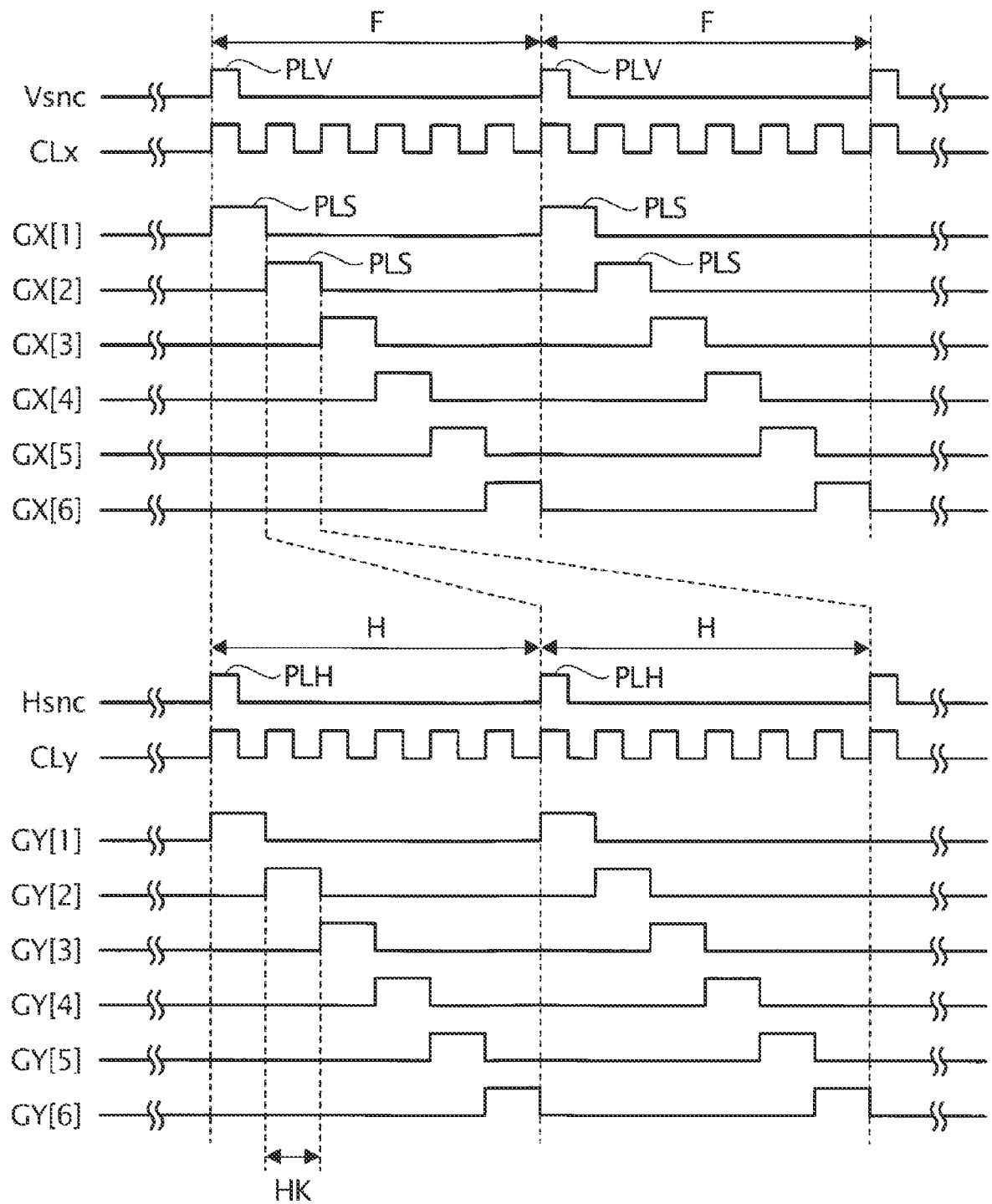
FIG. 8 is a timing chart illustrating an example of an operation of the touch panel.

FIG. 8 is a timing chart for describing an example of the control signal CtrT supplied to the detection control circuit 80 and an example of an operation of the detection control circuit 80. Here, the control signal CtRT is a signal including a vertical synchronization signal Vsnc, a vertical clock signal CLx, a horizontal synchronization signal Hsnc, and a horizontal clock signal CLy.

The vertical synchronization signal Vsnc is a signal including pulses PLV, and defines a frame period F as a period from a rising edge of the pulse PLV to a rising edge of the next pulse PLV. In the present embodiment, it is assumed that the frame period F includes Q horizontal scanning periods H. Hereinafter, among the Q horizontal scanning periods H included in the frame period F, the q-th horizontal scanning period H is referred to as a horizontal scanning period H[q].

The horizontal synchronization signal Hsnc is a signal including pulses PLH, and defines a horizontal scanning period H as a period from a rising edge of the pulse PLH to a rising edge of the next pulse PLH. In the present embodiment, it is assumed that the horizontal scanning period H includes R detection periods HK.

Hereinafter, among the R detection periods HK included in the horizontal scanning period H, the r-th detection period HK is referred to as a detection period HK[r]. Further, hereinafter, among the R detection periods HK included in the horizontal scanning period H[q], the r-th detection period HK[r] is referred to as a detection period HK[q][r].

The vertical clock signal CLx is a signal including pulses occurring at intervals corresponding to the horizontal scanning period H. The drive circuit 81 generates Q selection signals GX[1] to GX[Q] in one-to-one correspondence with the Q drive electrodes SX[1] to SX[Q] based on the vertical clock signal CLx. Hereinafter, among the Q selection signals GX[1] to GX[Q], the q-th selection signal GX is referred to as a selection signal GX[q].

The selection signal GX[q] maintains a high level during the horizontal scanning period H[q] which is the q-th horizontal scanning period H in the frame period F, and maintains a low level during a period other than the horizontal scanning period H[q] in the frame period F. Hereinafter, in the selection signal GX[q], a pulse that rises to the high level at the start of the horizontal scanning period H[q] and falls to the low level at the end of the horizontal scanning period H[q] is referred to as a drive pulse PLS.

The horizontal clock signal CLy is a signal including pulses occurring at intervals corresponding to the detection period HK. The detection circuit 82 generates R selection signals GY[1] to GY[R] in one-to-one correspondence with the R detection electrodes SY[1] to SY[R] based on the horizontal clock signal CLy. Hereinafter, among the R selection signals GY[1] to GY[R], the r-th selection signal GY is referred to as a selection signal GY[r].

The selection signal GY[r] maintains the high level during the detection period HK[r], which is the r-th detection period HK in the horizontal scanning period H[q], and maintains the low level during a period other than the detection period HK[r] in the horizontal scanning period H[q].

The detection circuit 82 selects the wiring LY[r] from among R wirings LY[1] to LY[R] provided in the detection section 800 based on the selection signal GY[r]. Specifically, the detection circuit 82 selects the wiring LY[r] corresponding to the selection signal GY[r] from among the R wirings LY[1] to LY[R] in the detection period HK[r] during which the selection signal GY[r] is at the high level.

Then, the detection circuit 82 acquires a detected signal Vx[r] indicating a potential of the wiring LY[r] from the wiring LY[r] selected in the detection period HK[r]. Next, the detection circuit 82 determines whether or not there is a touch made by the user of the printing apparatus 100 for a position Pos[q][r] where the drive electrode SX[q] corresponding to the selection signal GX[q] intersects the detection electrode SY[r] corresponding to the selection signal GY[r] in the detection period HK[q][r] by comparing a waveform of the detected signal Vx[r] with a waveform of a predetermined reference signal in the detection period HK[q][r]. Then, the detection circuit 82 generates the touch detection signal DT indicating the presence or absence of a touch made by the user of the printing apparatus 100 and the position of the touch based on a result of the determination.

As described above, in the detection section 800, the drive electrode SX[q] and the detection electrode SY[r] intersect each other when viewed in the Z1 direction. Therefore, a capacitance is formed between the drive electrode SX[q] and the detection electrode SY[r]. Specifically, a capacitance is formed between the electrode TX[q][r] of the drive electrode Sx[q] and the electrode TY[q][r] of the detection electrode SY[r]. Therefore, when the selection signal GX[q] including the drive pulse PLS is supplied to the wiring LX[q] included in the drive electrode SX[q] in the horizontal scanning period H[q], a potential of the detection electrode SY[r] fluctuates via the capacitance formed between the drive electrode SX[q] and the detection electrode SY[r]. When a finger or the like of the user of the printing apparatus 100 touches a portion near an intersection of the drive electrode SX[q] and the detection electrode SY[r], a capacitance is formed between the finger or the like of the user and the drive electrode SX[q] or the detection electrode SY[r]. Therefore, an aspect of the fluctuation of the potential of the detection electrode SY[r] when the selection signal GX[q] including the drive pulse PLS is supplied to the wiring LX[q] included in the drive electrode SX[q] and there is a touch made by the user for a portion near the intersection of the drive electrode SX[q] and the detection electrode SY[r] is different from an aspect of the fluctuation of the potential of the detection electrode SY[r] when the selection signal GX[q] including the drive pulse PLS is supplied to the wiring LX[q] included in the drive electrode SX[q] and there is no touch made by the user for a portion near the intersection of the drive electrode SX[q] and the detection electrode SY[r]. Here, when the selection signal GX[q] including the drive pulse PLS is supplied to the drive electrode SX[q], and there is no touch made by the user for the detection section 800, the detected signal Vx[r] detected from the wiring LY[r] is used as a reference signal. In this case, the waveform of the detected signal Vx[r] when the selection signal GX[q] including the drive pulse PLS is supplied to the drive electrode SX[q] and there is a touch made by the user for the position Pos[q][r] is different from the waveform of the reference signal. On the other hand, the waveform of the detected signal Vx[r] when the selection signal GX[q] including the drive pulse PLS is supplied to the drive electrode SX[q] and there is no touch made by the user for the position Pos[q][r] is substantially the same as the waveform of the reference signal. Therefore, the presence or absence of a touch for the position Pos[q][r] can be determined by comparing the waveform of the detected signal Vx[r] and the waveform of the reference signal in the detection period HK[q][r] as in the present embodiment. In the present embodiment, "being substantially the same" is a concept that includes not only a case of being completely the same but also a case of being capable of being considered to be the same when errors are taken into account. For example, "being substantially the same" may be a concept that includes a case of being the same when an error of 10% or less is removed.

In the present embodiment, the touch panel 8 is a so-called second-hand product that was used in an apparatus different from the display apparatus 500 before manufacturing of the display apparatus 500. That is, in the present embodiment, the display apparatus 500 is manufactured by reusing the second-hand touch panel 8 that was used in another apparatus.

4. Structure of Display Apparatus

The structure of the display apparatus 500 according to the present embodiment will be described below with reference to FIG. 9.

Figure 9:
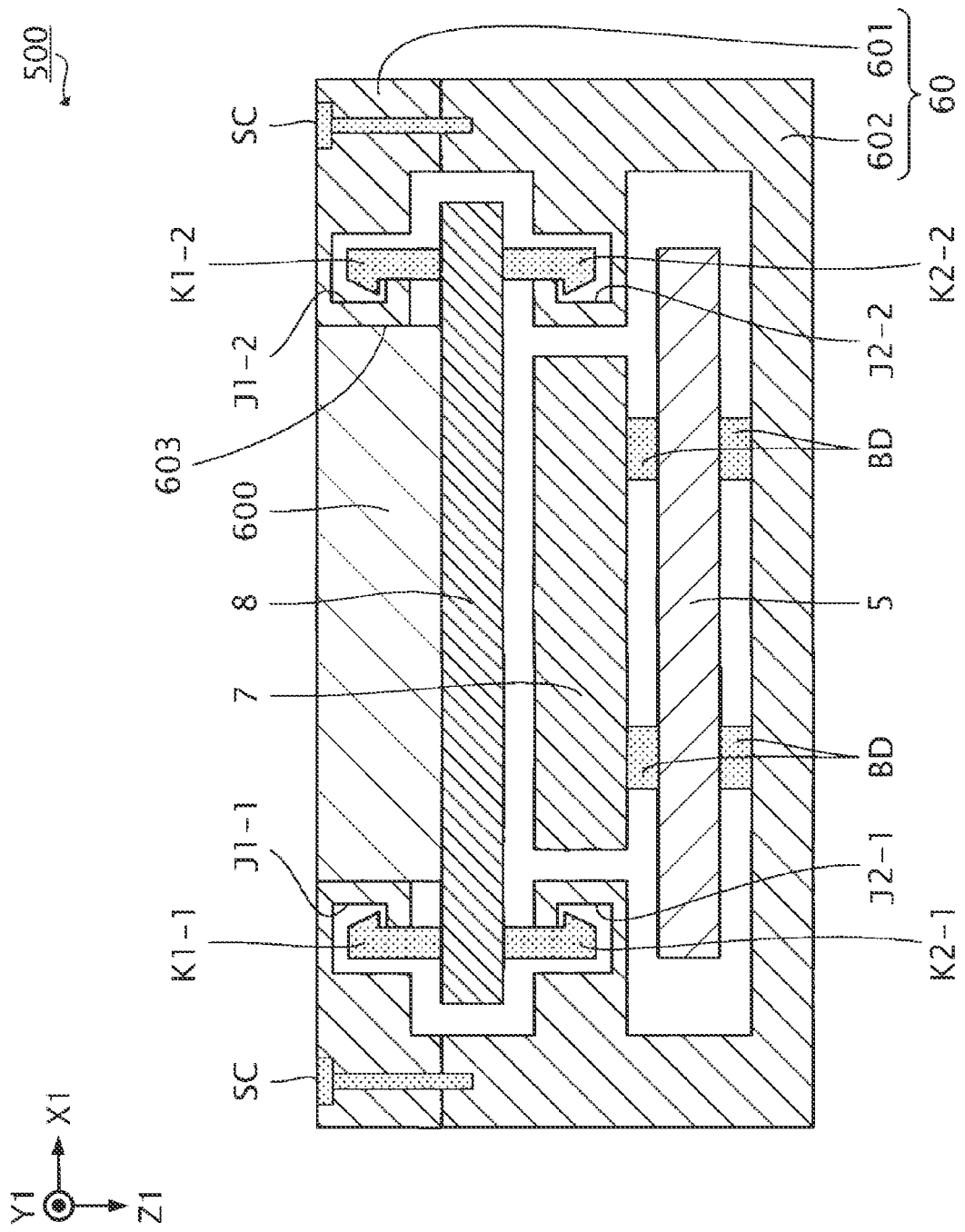
FIG. 9 is a cross-sectional view illustrating an example of a configuration of a display apparatus.

FIG. 9 is a cross-sectional view illustrating an example of a configuration of the display apparatus 500. FIG. 9 is a cross-sectional view illustrating a cross section of the display apparatus 500 when the display apparatus 500 is cut along a plane whose normal direction is the Y1 direction.

As illustrated in FIG. 9, the display apparatus 500 includes a cover glass 600 and an exterior case 60 in addition to the above-described interface control unit 5, display panel 7, and touch panel 8.

The exterior case 60 includes an upper exterior case 601 and a lower exterior case 602.

The upper exterior case 601 is provided in the Z2 direction when viewed from the lower exterior case 602, and is fixed to the lower exterior case 602 with a fixing tool SC such as a screw. The upper exterior case 601 has an opening 603 into which the cover glass 600 is fitted.

The lower exterior case 602 accommodates the interface control unit 5, the display panel 7, and the touch panel 8 in the lower exterior case 602. In the present embodiment, the interface control unit 5 is fixed to a bottom surface of the lower exterior case 602 with a fixing tool BD such as a screw. In the present embodiment, the display panel 7 is fixed to a Z2-direction surface of the interface control unit 5 with the fixing tool BD such as a screw.

The exterior case 60 includes a plurality of locking portions J corresponding to the plurality of locking portions K included in the touch panel 8. Specifically, the upper exterior case 601 of the exterior case 60 has a locking portion J1-1 corresponding to the locking portion K1-1 provided on the touch panel 8, and a locking portion J1-2 corresponding to the locking portion K1-2 provided on the touch panel 8. Specifically, the lower exterior case 602 of the exterior case 60 has a locking portion J2-1 corresponding to the locking portion K2-1 provided on the touch panel 8, and a locking portion J2-2 corresponding to the locking portion K2-2 provided on the touch panel 8. Hereinafter, the locking portion J1-1 and the locking portion J1-2 is collectively referred to as the locking portion J1. Hereinafter, the locking portion J2-1 and the locking portion J2-2 is collectively referred to as the locking portion J2.

As illustrated in FIG. 9, the locking portion J1-1 has a recess for accommodating the protruding portion TB of the locking portion K1-1, and the locking portion J1-2 has a recess for accommodating the protruding portion TB of the locking portion K1-2. Therefore, the touch panel 8 can be fixed to the upper exterior case 601 without using an adhesive by fitting the locking portion J1-1 and the locking portion J1-2 of the upper exterior case 601 onto the locking portion K1-1 and the locking portion K1-2.

Further, the locking portion J2-1 has a recess for accommodating the protruding portion TB of the locking portion K2-1, and the locking portion J2-2 has a recess for accommodating the protruding portion TB of the locking portion K2-2. Therefore, the touch panel 8 can be fixed to the lower exterior case 602 without using an adhesive by fitting the locking portion J2-1 and the locking portion J2-2 of the lower exterior case 602 onto the locking portion K2-1 and the locking portion K2-2.

In the present embodiment, as an example, it is assumed that the locking portion K has flexibility, and the locking portion K is displaced in the X-axis direction when an external force in the X-axis direction is applied to the locking portion K, and the displacement in the X-axis direction in the locking portion K is eliminated when the external force in the X-axis direction applied to the locking portion K is removed. Therefore, in the present embodiment, the user of the printing apparatus 100 can apply a force to the locking portion K1-1 in the X2 direction, and also apply a force to the locking portion K1-2 in the X1 direction to remove the touch panel 8 from the upper exterior case 601. Further, the user of the printing apparatus 100 can apply a force to the locking portion K2-1 in the X2 direction, and also apply a force to the locking portion K2-2 in the X1 direction to remove the touch panel 8 from the lower exterior case 602. That is, in the present embodiment, the touch panel 8 is detachably fixed to the interface unit 6.

In the present embodiment, a case where the touch panel 8 includes the plurality of locking portions K1 and the plurality of locking portions K2, and the exterior case 60 includes the plurality of locking portions J1 and the plurality of locking portions J2 has been described as an example. However, the present disclosure is not limited to such an aspect. The touch panel 8 may include only one of the plurality of locking portions K1 and the plurality of locking portions K2, and the exterior case 60 may include only one of the plurality of locking portions J1 and the plurality of locking portions J2.

5. Conclusion of Embodiment

As described above, the display apparatus 500 according to the present embodiment includes the touch panel 8 including the transparent electrode and the locking portion K, and the display panel 7 that displays information, in which the touch panel 8 is detachably fixed to the display apparatus 500 by fixing the locking portion K to the locking portion J provided in the display apparatus 500 without using an adhesive. In the present embodiment, the locking portion K is an example of a "first locking portion", and the locking portion J is an example of a "second locking portion".

As described above, according to the present embodiment, since the touch panel 8 is fixed to the display apparatus 500 without using an adhesive, there is a higher possibility that the touch panel 8 can be collected without being damaged when, for example, the display apparatus 500 is discarded as compared to an aspect according to the related art in which the touch panel 8 is fixed to the display apparatus 500 using an adhesive. As a result, according to the present embodiment, there is a higher possibility that rare resources such as transparent metal contained in the touch panel 8 can be collected as compared to the aspect according to the related art. According to the present embodiment, there is a higher possibility that the touch panel 8 can be collected and reused when, for example, the display apparatus 500 is discarded as compared to the aspect according to the related art. In other words, according to the present embodiment, it is possible to substantially reduce waste generation through recycling and reuse of the touch panel 8 as described in "12.5" of the sustainable development goals (SDGs) as compared to the aspect according to the related art. According to the present embodiment, since the touch panel 8 is fixed to the display apparatus 500 without using an adhesive, there is a higher possibility that chemicals such as an adhesive can be prevented from being discarded when, for example, the display apparatus 500 is discarded as compared to the aspect according to the related art in which the touch panel 8 is fixed to the display apparatus 500 using an adhesive. In other words, according to the present embodiment, it is possible to substantially reduce release of chemicals and all wastes to air, water, and soil as described in "12.4" of the SDGs as compared to the aspect according to the related art. As described above, according to the present embodiment, it is possible to make a greater contribution to Goal 12 of the SDGs, "Ensure sustainable consumption and production patterns" as compared to the aspect according to the related art.

According to the present embodiment, since the touch panel 8 is fixed to the display apparatus 500 without using an adhesive, there is a higher possibility that chemicals such as an adhesive can be prevented from being discarded when, for example, the display apparatus 500 is discarded as compared to the aspect according to the related art in which the touch panel 8 is fixed to the display apparatus 500 using an adhesive. According to the present embodiment, since the touch panel 8 is fixed to the display apparatus 500 without using an adhesive, it is possible to reduce a risk of contamination that may occur when ink ejected from the printing unit 2 onto the printing paper PP adheres to the adhesive as compared to the aspect according to the related art in which the touch panel 8 is fixed to the display apparatus 500 using an adhesive. In other words, according to the present embodiment, it is possible to substantially reduce the number of deaths and illnesses from hazardous chemicals and air, water, and soil pollution and contamination as described in "3.9" of the SDGs as compared to the aspect according to the related art. As described above, according to the present embodiment, it is possible to make a greater contribution to Goal 3 of the SDGs, "Ensure healthy lives and promote well-being for all at all ages" as compared to the aspect according to the related art.

According to the present embodiment, since the touch panel 8 is fixed to the display apparatus 500 without using an adhesive, there is a higher possibility that the touch panel 8 can be collected without being damaged and chemicals such as an adhesive can be prevented from being discarded when, for example, the display apparatus 500 is discarded as compared to the aspect according to the related art in which the touch panel 8 is fixed to the display apparatus 500 using an adhesive. In other words, according to the present embodiment, it is possible to reduce the adverse per capita environmental impact of cities as described in "11.6" of the SDGs as compared to the aspect according to the related art. As described above, according to the present embodiment, it is possible to make a greater contribution to Goal 11 of the SDGs, "Make cities and human settlements inclusive, safe, resilient, and sustainable" as compared to the aspect according to the related art.

According to the present embodiment, since the touch panel 8 is fixed to the display apparatus 500 without using an adhesive, there is a higher possibility that the touch panel 8 can be more easily collected when, for example, the display apparatus 500 is discarded as compared to the aspect according to the related art in which the touch panel 8 is fixed to the display apparatus 500 using an adhesive. Therefore, according to the present embodiment, it is possible to reduce difficulty in collecting the display apparatus 500 when, for example, the display apparatus 500 is discarded, which enables even disabled or elderly people to perform the work, and thus there is a higher possibility that new jobs can be created for disabled or elderly people as compared to the aspect according to the related art. In other words, according to the present embodiment, it is possible to empower and promote the social, economic, and political inclusion of all, irrespective of age, sex, disability, race, ethnicity, origin, religion or economic or other statuses as described in "10.2" of the SDGs as compared to the aspect according to the related art. As described above, according to the present embodiment, it is possible to make a greater contribution to Goal 10 of the SDGs, "Reduce income inequality within and among countries" as compared to the aspect according to the related art.

Furthermore, in the display apparatus 500 according to the present embodiment, the locking portion K is fixed to the locking portion J by fitting the locking portion J onto the locking portion K.

Therefore, according to the present embodiment, there is a higher possibility that the touch panel 8 can be more easily collected without being damaged when, for example, the display apparatus 500 is discarded as compared to the aspect according to the related art. Therefore, according to the present embodiment, it is possible to make a greater contribution to Goal 12 of the SDGs "Ensure sustainable consumption and production patterns" and Goal 10 "Reduce income inequality within and among countries" as compared to the aspect according to the related art.

Although an aspect of the display apparatus 500 according to the present embodiment in which the locking portion K is fixed to the locking portion J by fitting the locking portion J onto the locking portion K has been described as an example, the present disclosure is not limited to such an aspect. In the display apparatus 500, the locking portion K may be fixed to the locking portion J by fitting the locking portion K onto the locking portion J.

In the display apparatus 500 according to the present embodiment, the touch panel 8 is a second-hand product that was used before the manufacturing of the display apparatus 500.

Therefore, according to the present embodiment, it is possible to substantially reduce waste generation through recycling and reuse of the touch panel 8 as described in "12.5" of the SDGs as compared to the aspect according to the related art. Therefore, according to the present embodiment, it is possible to make a greater contribution to Goal 12 of the SDGs, "Ensure sustainable consumption and production patterns" as compared to the aspect according to the related art.

In the display apparatus 500 according to the present embodiment, the touch panel 8 is replaceable.

Therefore, according to the present embodiment, it is possible to substantially reduce waste generation through recycling and reuse of the touch panel 8 as described in "12.5" of the SDGs as compared to the aspect according to the related art. Therefore, according to the present embodiment, it is possible to make a greater contribution to Goal 12 of the SDGs, "Ensure sustainable consumption and production patterns" as compared to the aspect according to the related art.

B. Modified Examples

Each embodiment described above can be modified in various ways. Specific aspects of the modification are described below. Two or more aspects arbitrarily selected from the following examples can be appropriately and compatibly combined. In the modified example described below, the reference numerals referred to in the above description will be used for elements whose actions and functions are equivalent to those in the embodiment, and a detailed description thereof will be omitted as appropriate.

B.1. First Modified Example

In the embodiment described above, a case where the touch panel 8 includes the locking portion K, and the exterior case 60 includes the locking portion J has been described as an example, but the present disclosure is not limited to such an aspect.

Figure 10:
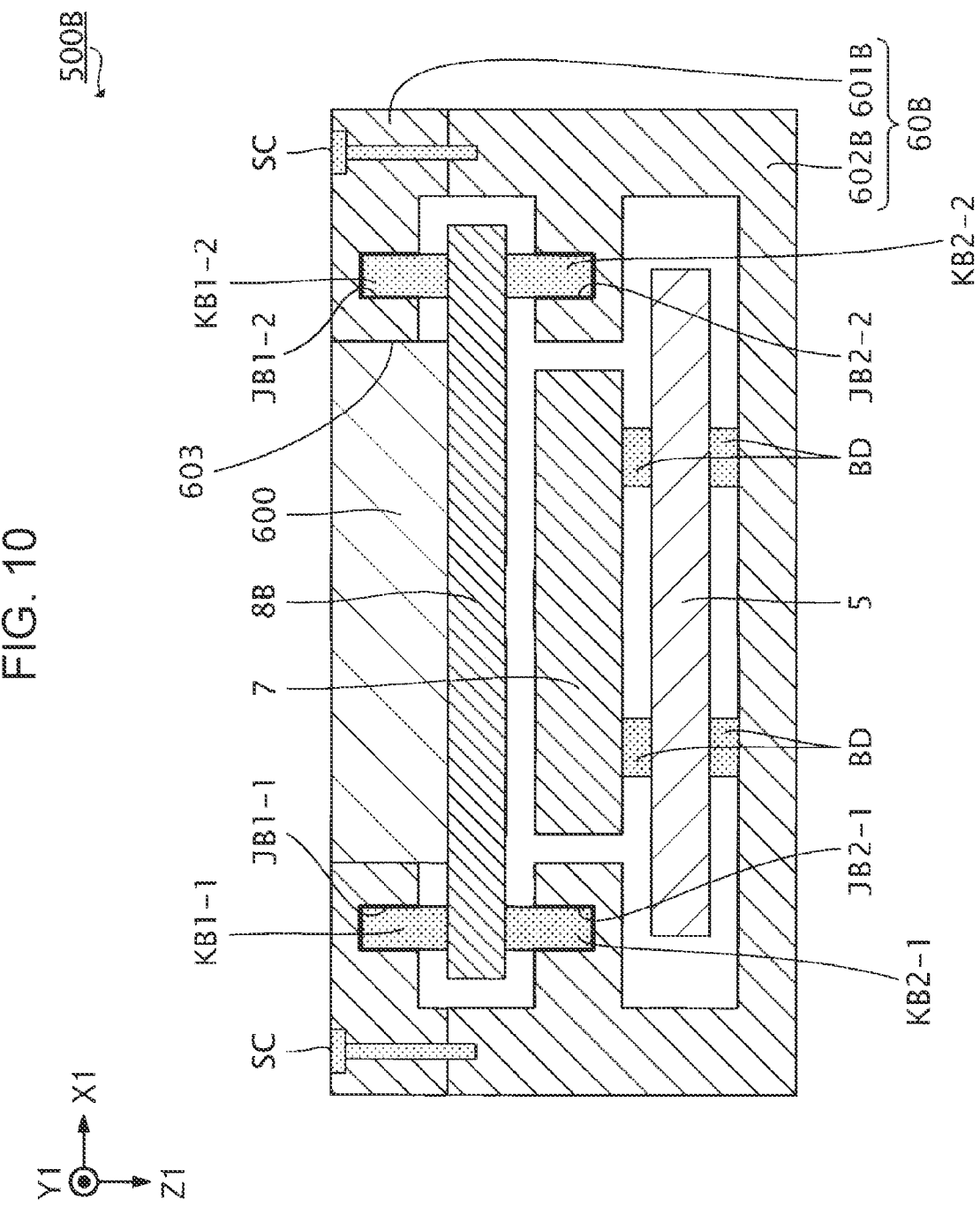
FIG. 10 is a cross-sectional view illustrating an example of a configuration of a display apparatus according to a first modified example of the present disclosure.

FIG. 10 is a cross-sectional view illustrating an example of a configuration of a display apparatus 500B according to the present modified example.

As illustrated in FIG. 10, the display apparatus 500B is configured similarly to the display apparatus 500 according to the embodiment except that the display apparatus 500B includes a touch panel 8B instead of the touch panel 8 and includes an exterior case 60B instead of the exterior case 60.

The touch panel 8B is configured similarly to the touch panel 8 according to the embodiment, except that the touch panel 8B includes a plurality of locking portions KB instead of the plurality of locking portions K.

Specifically, the touch panel 8B includes a locking portion KB1-1 instead of the locking portion K1-1, includes a locking portion KB1-2 instead of the locking portion K1-2, includes a locking portion KB2-1 instead of the locking portion K2-1, and includes a locking portion KB2-2 instead of the locking portion K2-2. Hereinafter, the locking portion KB1-1 and the locking portion KB1-2 are collectively referred to as the locking portion KB1, and the locking portion KB2-1 and the locking portion KB2-2 are collectively referred to as the locking portion KB2.

In the present modified example, the locking portion KB is a protrusion. Specifically, the locking portion KB1 is a protrusion that protrudes in the Z2 direction from a Z2-direction surface of a protective layer 801 included in a detection section 800 of the touch panel 8B, and the locking portion KB2 is a protrusion that protrudes in the Z1 direction from a Z1-direction surface of a protective layer 805 included in the detection section 800 of the touch panel 8B.

The exterior case 60B is configured similarly to the exterior case 60 according to the embodiment, except that the exterior case 60B includes a plurality of locking portions JB instead of the plurality of locking portions J. Specifically, the exterior case 60B includes an upper exterior case 601B including a locking portion JB1-1 instead of the locking portion J1-1 and including a locking portion JB1-2 instead of the locking portion J1-2, and a lower exterior case 602B including a locking portion JB2-1 instead of the locking portion J2-1 and including a locking portion JB2-2 instead of the locking portion J2-2. Hereinafter, the locking portion JB1-1 and the locking portion JB1-2 are collectively referred to as the locking portion JB1, and the locking portion JB2-1 and the locking portion JB2-2 are collectively referred to as the locking portion JB2.

In the present modified example, the locking portion JB is an opening. Specifically, the locking portion JB1 is an opening for accommodating the locking portion KB1, and the locking portion JB2 is an opening for accommodating the locking portion KB2. More specifically, in the present modified example, the locking portion KB1-1 is fitted into the locking portion JB1-1, and the locking portion KB1-2 is fitted into the locking portion JB1-2, so that the touch panel 8B is detachably fixed to the upper exterior case 601B without using an adhesive. Further, in the present modified example, the locking portion KB2-1 is fitted into the locking portion JB2-1, and the locking portion KB2-2 is fitted into the locking portion JB2-2, so that the touch panel 8B is detachably fixed to the lower exterior case 602B without using an adhesive.

As described above, the display apparatus 500B according to the present modified example includes the touch panel 8B including a transparent electrode and the locking portion KB, and a display panel 7 that displays information, in which the touch panel 8B is detachably fixed to the display apparatus 500B by fixing the locking portion KB to the locking portion JB provided in the display apparatus 500B without using an adhesive, the locking portion KB is a protrusion, and the locking portion JB is an opening.

Therefore, according to the present modified example, there is a higher possibility that the touch panel 8B can be more easily collected without being damaged when, for example, the display apparatus 500B is discarded as compared to the aspect according to the related art. Therefore, according to the present modified example, it is possible to make a greater contribution to Goal 12 "Ensure sustainable consumption and production patterns" and Goal 10 "Reduce income inequality within and among countries" of the SDGs as compared to the aspect according to the related art.

In the present modified example, a case where the locking portion KB is a protrusion and the locking portion JB is an opening has been described as an example, but the present disclosure is not limited to such an aspect. For example, in the present modified example, the locking portion KB may be an opening, and the locking portion JB may be a protrusion. In the present embodiment, the locking portion KB is an example of the "first locking portion", and the locking portion JB is an example of the "second locking portion".

B.2. Second Modified Example

In the embodiment and the first modified example described above, a case where the touch panel 8 or 8B includes the locking portion K or KB, and the exterior case 60 or 60B includes the locking portion J or JB has been described as an example, but the present disclosure is not limited to such an aspect.

Figure 11:
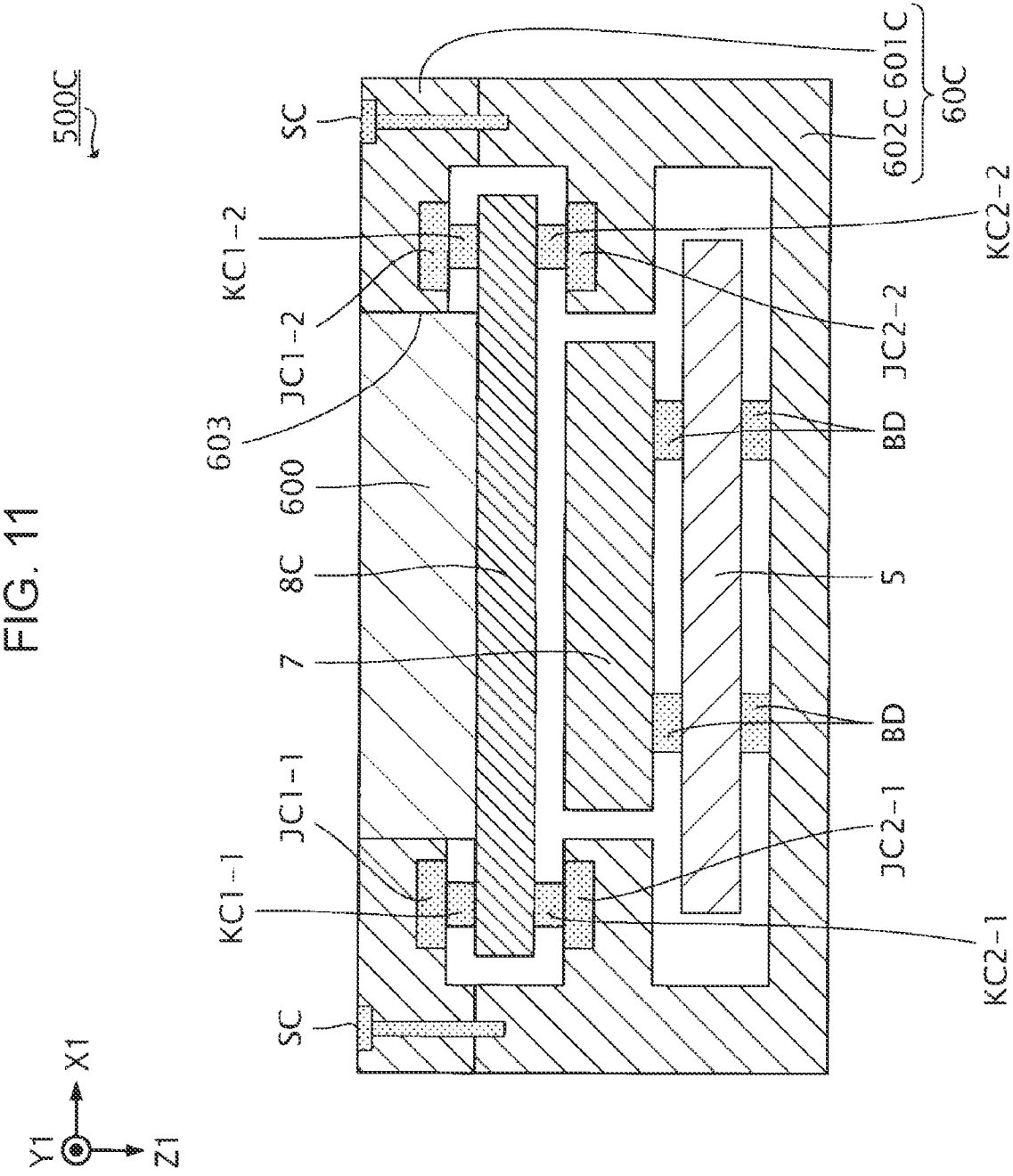
FIG. 11 is a cross-sectional view illustrating an example of a configuration of a display apparatus according to a second modified example of the present disclosure.

FIG. 11 is a cross-sectional view illustrating an example of a configuration of a display apparatus 500C according to the present modified example.

As illustrated in FIG. 11, the display apparatus 500C has the same configuration as that of the display apparatus 500 according to the embodiment except that the display apparatus 500C includes a touch panel 8C instead of the touch panel 8 and includes an exterior case 60C instead of the exterior case 60.

The touch panel 8C is configured similarly to the touch panel 8 according to the embodiment, except that the touch panel 8C includes a plurality of locking portions KC instead of the plurality of locking portions K.

Specifically, the touch panel 8C includes a locking portion KC1-1 instead of the locking portion K1-1, includes a locking portion KC1-2 instead of the locking portion K1-2, includes a locking portion KC2-1 instead of the locking portion K2-1, and includes a locking portion KC2-2 instead of the locking portion K2-2. Hereinafter, the locking portion KC1-1 and the locking portion KC1-2 are collectively referred to as the locking portion KC1, and the locking portion KC2-1 and the locking portion KC2-2 are collectively referred to as the locking portion KC2.

In the present modified example, the locking portion KC is a magnet. Specifically, the locking portion KC1 is a magnet provided on a Z2-direction surface of a protective layer 801 included in a detection section 800 of the touch panel 8C, and the locking portion KC2 is a magnet provided on a Z1-direction surface of a protective layer 805 included in the detection section 800 of the touch panel 8C.

The exterior case 60C is configured similarly to the exterior case 60 according to the embodiment, except that the exterior case 60C includes a plurality of locking portions JC instead of the plurality of locking portions J. Specifically, the exterior case 60C includes an upper exterior case 601C including a locking portion JC1-1 instead of the locking portion J1-1 and including a locking portion JC1-2 instead of the locking portion J1-2, and a lower exterior case 602C including a locking portion JC2-1 instead of the locking portion J2-1 and including a locking portion JC2-2 instead of the locking portion J2-2. Hereinafter, the locking portion JC1-1 and the locking portion JC1-2 are collectively referred to as the locking portion JC1, and the locking portion JC2-1 and the locking portion JC2-2 are collectively referred to as the locking portion JC2.

In the present modified example, the locking portion JC is a magnet or metal. Specifically, the locking portion JC1 is a magnet or metal to be pulled by the locking portion KC1, and the locking portion JC2 is a magnet or metal to be pulled by the locking portion KC2. More specifically, in the present modified example, the locking portion KC1-1 pulls the locking portion JC1-1, and the locking portion KC1-2 pulls the locking portion JC1-2, so that the touch panel 8C is detachably fixed to the upper exterior case 601C without using an adhesive. In the present modified example, the locking portion KC2-1 pulls the locking portion JC2-1, and the locking portion KC2-2 pulls the locking portion JC2-2, so that the touch panel 8C is detachably fixed to the lower exterior case 602C without using an adhesive.

As described above, the display apparatus 500C according to the present modified example includes the touch panel 8C including a transparent electrode and the locking portion KC, and a display panel 7 that displays information, in which the touch panel 8C is detachably fixed to the display apparatus 500C by fixing the locking portion KC to the locking portion JC provided in the display apparatus 500C without using an adhesive, the locking portion KC is a magnet, and the locking portion JC is a magnet or metal.

Therefore, according to the present embodiment, there is a higher possibility that the touch panel 8C can be more easily collected without being damaged when, for example, the display apparatus 500C is discarded as compared to the aspect according to the related art. Therefore, according to the present modified example, it is possible to make a greater contribution to Goal 12 "Ensure sustainable consumption and production patterns" and Goal 10 "Reduce income inequality within and among countries" of the SDGs as compared to the aspect according to the related art.

In the present modified example, a case where the locking portion KC is a magnet and the locking portion JC is a magnet or metal has been described as an example, but the present disclosure is not limited to such an aspect. For example, in the present modified example, the locking portion KC may be a metal, and the locking portion JC may be a magnet. In the present embodiment, the locking portion KC is an example of the "first locking portion", and the locking portion JC is an example of the "second locking portion".

B.3. Third Modified Example

In the embodiment and the first and second modified examples described above, a case where the display apparatus 500, the display apparatus 500B, or the display apparatus 500C is mounted on the printing apparatus 100 has been described as an example, but the present disclosure is not limited to such an aspect. The display apparatus 500, the display apparatus 500B, or the display apparatus 500C can also be used alone. Further, the display apparatus 500, the display apparatus 500B, or the display apparatus 500C can be applied to electronic devices other than the printing apparatus 100, such as a camera, a projector, and a smartphone.

Figure 12:
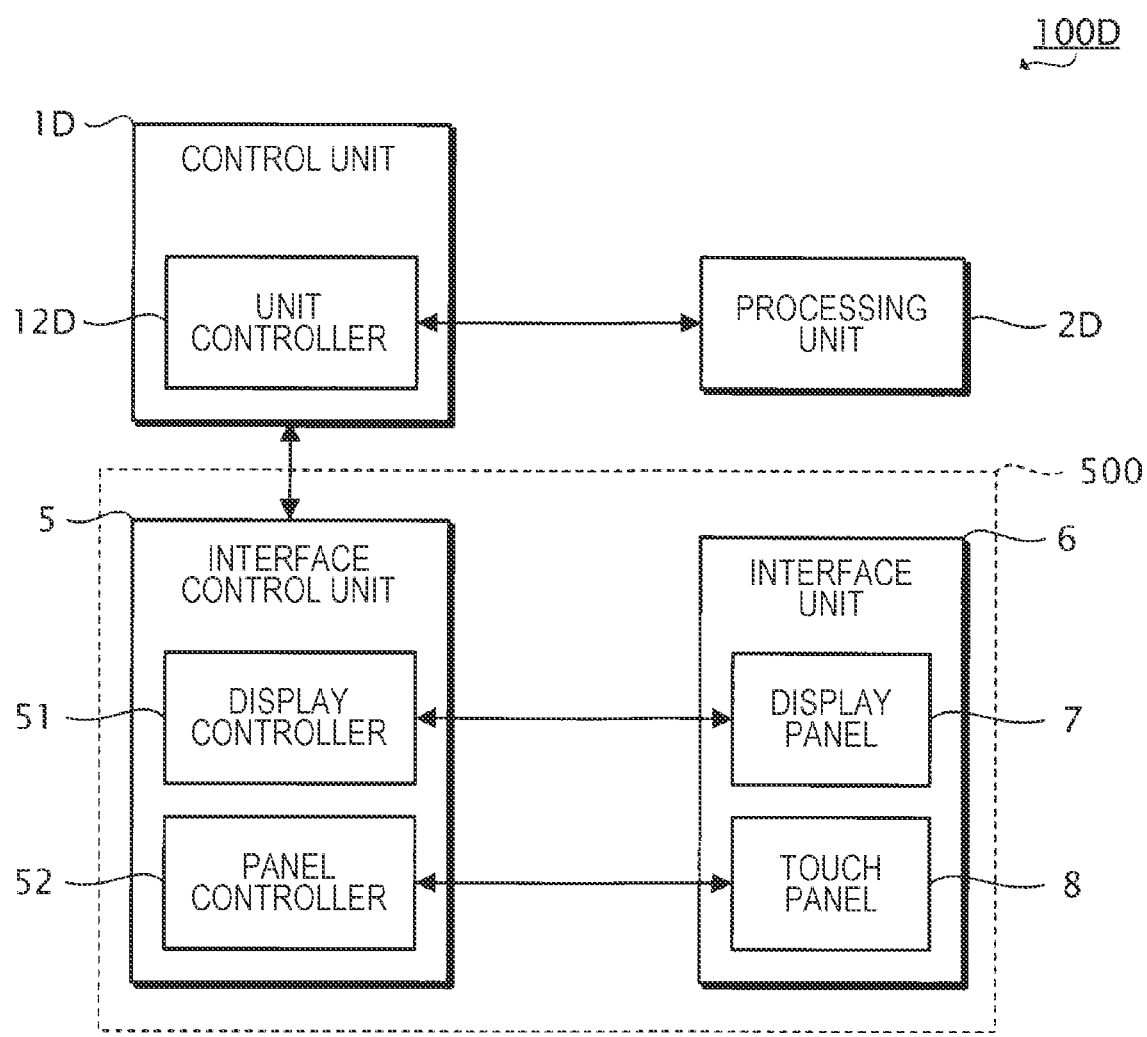
FIG. 12 is a block diagram illustrating an example of a configuration of an electronic device according to a third modified example of the present disclosure.

FIG. 12 is a functional block diagram illustrating an example of a functional configuration of an electronic device 100D according to the present modified example.

As illustrated in FIG. 12, the electronic device 100D includes a control unit 1D that controls the electronic device 100D, a processing unit 2D that executes various types of processing, and the display apparatus 500.

Here, for example, when the electronic device 100D is a camera, the processing unit 2D is an imaging unit that executes imaging processing of imaging a target object, when the electronic device 100D is a projector, the processing unit 2D is a projection unit that executes projection processing of projecting a desired image, and when the electronic device 100D is a smartphone, the processing unit 2D is a communication unit that executes communication processing of communicating with an external device.

According to the present modified example, there is a higher possibility that the touch panel 8C can be more easily collected without being damaged when, for example, the display apparatus 500C is discarded as compared to the aspect according to the related art. Therefore, according to the present modified example, it is possible to make a greater contribution to Goal 12 "Ensure sustainable consumption and production patterns" and Goal 10 "Reduce income inequality within and among countries" of the SDGs as compared to the aspect according to the related art.

B.4. Fourth Modified Example

In the embodiment and the first to third modified examples, a case where the touch panel 8, the touch panel 8B, or the touch panel 8C is a second-hand product has been described as an example, but a new unused product may be adopted as the touch panel 8, the touch panel 8B, or the touch panel 8C.

What is claimed is:

1. A display apparatus comprising:
    a touch panel that includes
        layers which are stacked and in which a transparent electrode is disposed, and
        a first locking portion which is directly contacted on a surface of an outermost layer among the layers;
    a second locking portion; and
    a display panel that displays information,
    the touch panel being detachably fixed to the display apparatus by fixing the first locking portion to the second locking portion provided in the display apparatus without using an adhesive.

2. The display apparatus according to claim 1, wherein one of the first locking portion and the second locking portion is a magnet, and
    another one of the first locking portion and the second locking portion is a magnet or metal.

3. The display apparatus according to claim 1, wherein one of the first locking portion and the second locking portion is an opening, and
    another one of the first locking portion and the second locking portion is a protrusion.

4. The display apparatus according to claim 1, wherein the first locking portion is fixed to the second locking portion by fitting one of the first locking portion and the second locking portion onto another one of the first locking portion and the second locking portion.

5. The display apparatus according to claim 1, wherein the touch panel is a second-hand product that was used before manufacturing of the display apparatus.

6. The display apparatus according to claim 1, wherein the touch panel is configured to be replaced.

7. The display apparatus according to claim 1, wherein the surface of the outermost layer is opposite to an opposite surface of a different outermost layer among the layers, the different outer outermost layer is different from the outermost layer, and the opposite surface faces the display panel.

8. An image forming apparatus comprising:
a display apparatus that includes
a touch panel that includes
layers which are stacked and in which a transparent electrode is disposed, and
a first locking portion which is directly contacted on a surface of an outermost layer among the layers,
a second locking portion, and
a display panel that displays information;
a transport unit that transports a medium; and
an image forming unit that forms an image by applying a coloring material onto the medium,
the touch panel being detachably fixed to the display apparatus by fixing the first locking portion to the second locking portion provided in the display apparatus without using an adhesive.

9. The image forming apparatus according to claim 8, wherein
one of the first locking portion and the second locking portion is a magnet, and
another one of the first locking portion and the second locking portion is a magnet or metal.

10. The image forming apparatus according to claim 8, wherein
one of the first locking portion and the second locking portion is an opening, and
another one of the first locking portion and the second locking portion is a protrusion.

11. The image forming apparatus according to claim 8, wherein
the first locking portion is fixed to the second locking portion by fitting one of the first locking portion and the second locking portion onto another one of the first locking portion and the second locking portion.

12. The image forming apparatus according to claim 8, wherein
the touch panel is a second-hand product that was used before manufacturing of the display apparatus.

13. The image forming apparatus according to claim 8, wherein
the touch panel is configured to be replaced.

* * * * *